(12) United States Patent
Kim et al.

(10) Patent No.: US 8,783,229 B2
(45) Date of Patent: Jul. 22, 2014

(54) INTERNAL COMBUSTION ENGINE, COMBUSTION CHARGE FORMATION SYSTEM, AND METHOD

(75) Inventors: Hoisan Kim, Dunlap, IL (US); Mark Sommars, Sparland, IL (US); Martin Willi, Dunlap, IL (US); Scott Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 775 days.

(21) Appl. No.: 12/795,166

(22) Filed: Jun. 7, 2010

(65) Prior Publication Data

US 2011/0297128 A1      Dec. 8, 2011

(51) Int. Cl.
*F02M 69/22* (2006.01)
*F02B 7/06* (2006.01)

(52) U.S. Cl.
USPC ........... 123/455; 123/445; 123/525; 123/467; 123/575; 123/590; 239/433; 239/434; 222/420; 222/421; 222/422

(58) Field of Classification Search
USPC ......... 417/480, 549, 544, 419, 362, 509, 510; 239/87, 91, 89, 584, 101, 103–104, 239/433–434; 123/294, 445, 434, 455, 467, 123/472, 575, 590, 527, 698; 226/92; 222/420–422
See application file for complete search history.

(56) References Cited

U.S. PATENT DOCUMENTS

| | | | |
|---|---|---|---|
| 1,622,266 A | 3/1927 | Ake | |
| 2,413,136 A * | 12/1946 | Burger | 222/282 |
| 2,537,336 A | 1/1951 | Ericson | |
| 2,589,505 A | 3/1952 | Morris | |
| 3,236,219 A * | 2/1966 | Bilisco | 123/495 |
| 4,637,353 A | 1/1987 | Codrington | |
| 4,735,185 A | 4/1988 | Imoto et al. | |
| 4,742,801 A | 5/1988 | Kelgard | |
| 4,831,993 A | 5/1989 | Kelgard | |
| 4,955,340 A | 9/1990 | Elliott | |
| 5,369,948 A | 12/1994 | Vertens et al. | |
| 5,661,895 A | 9/1997 | Irgens | |
| 5,870,978 A * | 2/1999 | Willi et al. | 123/27 GE |
| 6,079,636 A | 6/2000 | Rembold et al. | |
| 6,273,689 B1 | 8/2001 | Kenichi et al. | |
| 6,401,696 B1 | 6/2002 | Heimberg | |
| 6,640,787 B2 | 11/2003 | Hashimoto et al. | |
| 6,928,975 B2 * | 8/2005 | Lauritsen | 123/196 R |
| 7,007,669 B1 | 3/2006 | Willi et al. | |
| 7,100,578 B2 | 9/2006 | Yamazaki et al. | |
| 7,410,347 B2 | 8/2008 | Radue | |
| 7,438,050 B2 | 10/2008 | Allen | |
| 2002/0148449 A1 | 10/2002 | Peng | |

* cited by examiner

*Primary Examiner* — Lindsay Low
*Assistant Examiner* — Kevin Lathers
(74) *Attorney, Agent, or Firm* — Liell & McNeil

(57) ABSTRACT

A gaseous fuel internal combustion engine includes an engine housing defining at least one cylinder, and an intake housing defining an intake passage fluidly connecting with the at least one cylinder. The engine includes a gaseous fuel delivery mechanism coupled with the engine housing and a distributed ignition promoting mechanism having a bead presentation device extending into the intake passage and configured to present a liquid bead of distributed ignition promoting material therein such as engine lubricating oil. During operation, gases passing through the intake passage dislodge the liquid bead from the bead presentation device and carry the distributed ignition promoting material into the cylinder for distributively igniting therein a mixture containing a gaseous fuel, air and the distributed ignition promoting material.

20 Claims, 5 Drawing Sheets

INTERNAL COMBUSTION ENGINE, COMBUSTION CHARGE FORMATION SYSTEM, AND METHOD

TECHNICAL FIELD

The present disclosure relates generally to internal combustion engines, and relates more particularly to presenting a liquid bead of distributed ignition promoting material in an intake passage of a gaseous fuel internal combustion engine.

BACKGROUND

The use of gaseous fuels in internal combustion engines provides a number of advantages over other hydrocarbon fuels, such as conventional diesel. Gaseous fuels such as natural gas may be less expensive than other hydrocarbon fuels, more readily available in remote areas and may burn relatively cleaner during operation. Cleaner burning can result in a reduced amount of combustion byproducts such as carbon monoxide, oxides of nitrogen ($NO_X$), and unburned hydrocarbons. Compression ignited as well as spark ignited gaseous fuel internal combustion engines are well known and widely used.

Compression ignition gaseous fuel internal combustion engines often employ a pilot fuel which is mixed with the primary gaseous fuel and air to form a combustion charge. The pilot fuel can enhance the ability of the combustion charge to be ignited when compressed within a cylinder. Spark ignited gaseous fuel engines employ a spark plug to ignite the combustion charge at a desired time. Engineers have recognized for some time that the inherent clean burning characteristics of certain gaseous fuel engines can be further improved by operating the engines on a relatively lean mixture of fuel and air. Lean burning strategies have been advantageously used in particular to minimize the relative quantity of $NO_X$ produced during operation. One lean burning strategy for a gaseous fuel internal combustion engine is disclosed in U.S. Pat. No. 7,007,669 to Willi et al. Willi et al. propose a method for operating an internal combustion engine which includes introducing a pilot fuel into a main combustion chamber, along with air and a primary fuel to form a combustion charge. A fuel injector may be used to inject the pilot fuel into the main combustion chamber, and the combustion charge is ignited in the main combustion chamber via a spark. Ignition of the combustion charge takes place in Willi et al. via a phenomenon known as distributed ignition.

SUMMARY

In one aspect, a method of operating a gaseous fuel internal combustion engine includes forming a liquid bead of distributed ignition promoting material on a bead presentation device in an intake passage of the gaseous fuel internal combustion engine. The method further includes dislodging the liquid bead from the bead presentation device by way of gases passing through the intake passage, and distributively igniting a charge that includes a gaseous fuel, air and the distributed ignition promoting material, in a cylinder of the gaseous fuel internal combustion engine.

In another aspect, a gaseous fuel internal combustion engine includes an engine housing defining at least one cylinder, and an intake housing defining an intake passage fluidly connecting with the at least one cylinder. The gaseous fuel internal combustion engine further includes a gaseous fuel delivery mechanism coupled with the engine housing, and a distributed ignition promoting mechanism including a bead presentation device extending into the intake passage. The bead presentation device is configured to present a liquid bead of distributed ignition promoting material for dislodging from the bead presentation device by way of gases passing through the intake passage.

In still another aspect, a combustion charge formation system for a gaseous fuel internal combustion engine includes a gaseous fuel delivery mechanism including a fuel supply conduit and a metering device configured to meter gaseous fuel from the fuel supply conduit to a cylinder of a gaseous fuel internal combustion engine. The combustion charge formation system further includes a combustion air delivery mechanism including an intake housing defining an intake passage, and a distributed ignition promoting mechanism. The distributed ignition promoting mechanism includes a bead presentation device extending into the intake passage and configured to present a liquid bead of distributed ignition promoting material for dislodging from the bead presentation device by way of gases passing through the intake passage.

DETAILED DESCRIPTION

Figure 1:
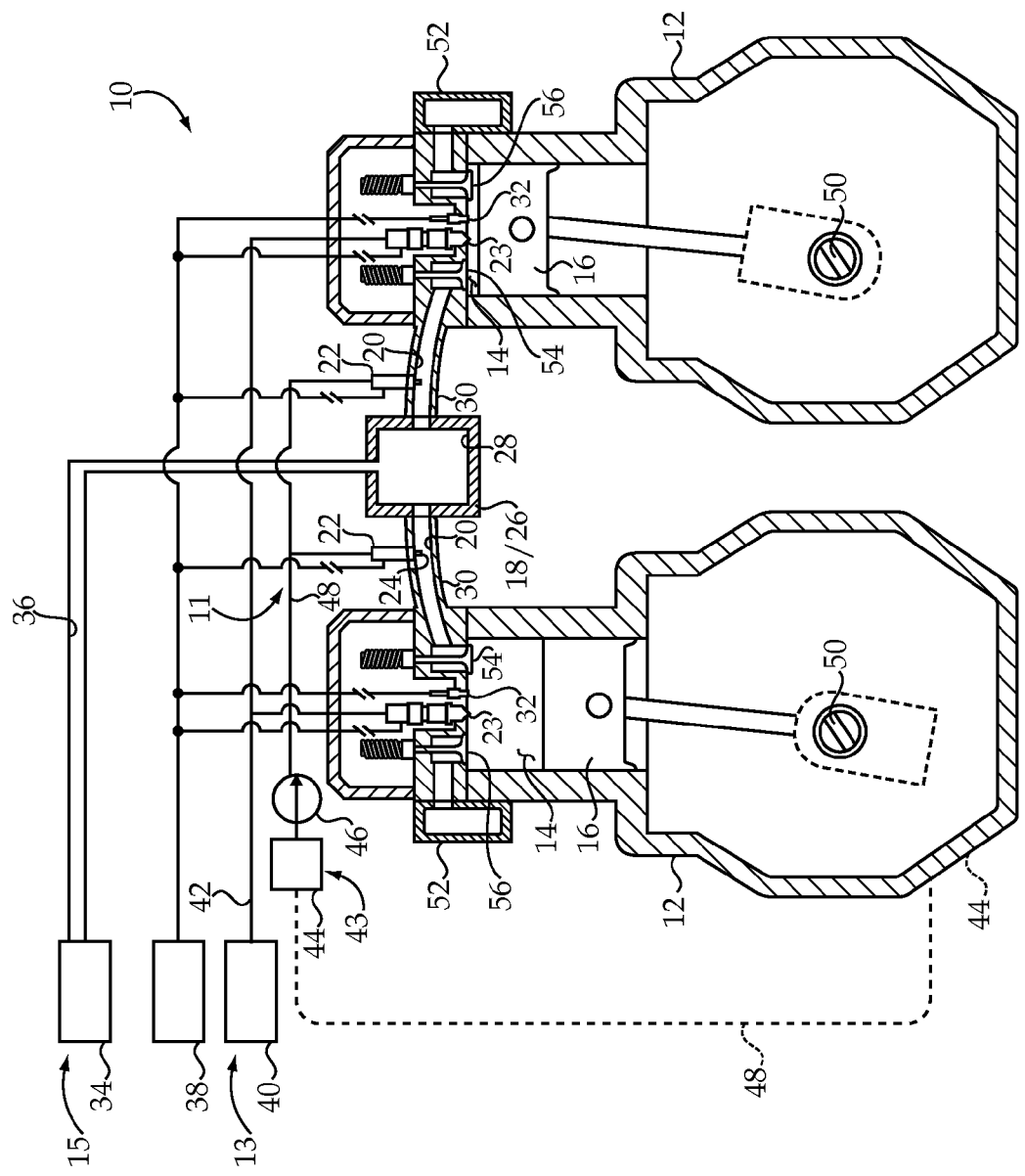
FIG. 1 is a partially sectioned side diagrammatic view of a gaseous fuel internal combustion engine, according to one embodiment.

Referring to FIG. 1, there is shown a gaseous fuel internal combustion engine 10 according to one embodiment. Engine 10 may include an engine housing 12 defining one or more cylinders 14. In FIG. 1, two cylinders 14 are shown side by side for illustrative purposes. In a production embodiment, cylinders 14 might be in-line, in a V-configuration or still another arrangement. A piston 16 may be positioned within each of cylinders 14 and coupled with a crankshaft 50 in a conventional manner. In one embodiment, engine 10 may include a spark ignited engine having a sparkplug 32 positioned at least partially within each of cylinders 14. Sparkplugs 32 may be configured to ignite a combustible charge in the corresponding cylinder 14, which may be a relatively lean mixture of a gaseous fuel, air and a distributed ignition promoting material, as further described herein.

Engine 10 may include an intake housing 18 defining an intake passage 20 fluidly connecting with each cylinder 14. Engine 10 may further include a combustion charge formation system 11 comprised of a gaseous fuel delivery mechanism 13, a combustion air delivery mechanism 15, and a distributed ignition promoting mechanism 22 associated with each cylinder 14. Gaseous fuel delivery mechanism 13 may include a gaseous fuel supply 40 and a fuel supply conduit 42 connecting with gaseous fuel supply 40 and also with engine housing 12. Gaseous fuel delivery mechanism 13 may further include a metering device 23 which is configured to meter a gaseous fuel such as natural gas from fuel supply conduit 42 to each of cylinders 14. In the illustrated embodiment, each metering device 23 is depicted as a direct injection gaseous fuel metering device, however, in other embodiments a different strategy might be used. For example, rather than directly injecting gaseous fuel into cylinders 14, gaseous fuel might be supplied upstream of engine housing 12 and supplied to cylinders 14 already mixed with intake air.

Combustion air delivery mechanism 15 may include an air supply 34 such as a charge air supply device including a turbocharger, or an ambient air inlet, and an air conduit 36 which supplies intake air to intake housing 18. Intake passage(s) 20 of intake housing 18 may fluidly connect with each cylinder 14. In one embodiment, intake housing 18 may include an intake manifold 26 having a plenum 28 and a plurality of intake runners 30 which each define an intake passage 20 fluidly connecting with one of cylinders 14. Single cylinder embodiments of engine 10, not including a conventional intake manifold, are also contemplated.

Each of cylinders 14 may be equipped with at least one intake valve 54 and at least one exhaust valve 56. Intake valves 54 may be operable in a conventional manner to fluidly connect the corresponding intake passage 20 with the corresponding cylinder 14. Exhaust valves 56 may likewise be operable in a conventional manner to fluidly connect the corresponding cylinder 14 with an exhaust system 52 of engine 10. Various aspects and components of engine 10 may be electronically controlled. To this end, engine 10 may further include an electronic control unit 38 in control communication with each sparkplug 32, with each metering device 23, and with such other components of engine 10 as is deemed desirable or necessary. Engine 10 may further include an oil system 43 having an oil sump 44, an oil transfer pump 46 and an oil supply conduit 48. In the embodiment shown, oil sump 44 is depicted as a component separate from the oil sump or oil pan which would typically be coupled with engine housing 12. It should be appreciated, however, that in certain embodiments, the oil sump might include or be connected with an engine oil pan or the like, as shown via the dashed lines in FIG. 1.

Figure 2:
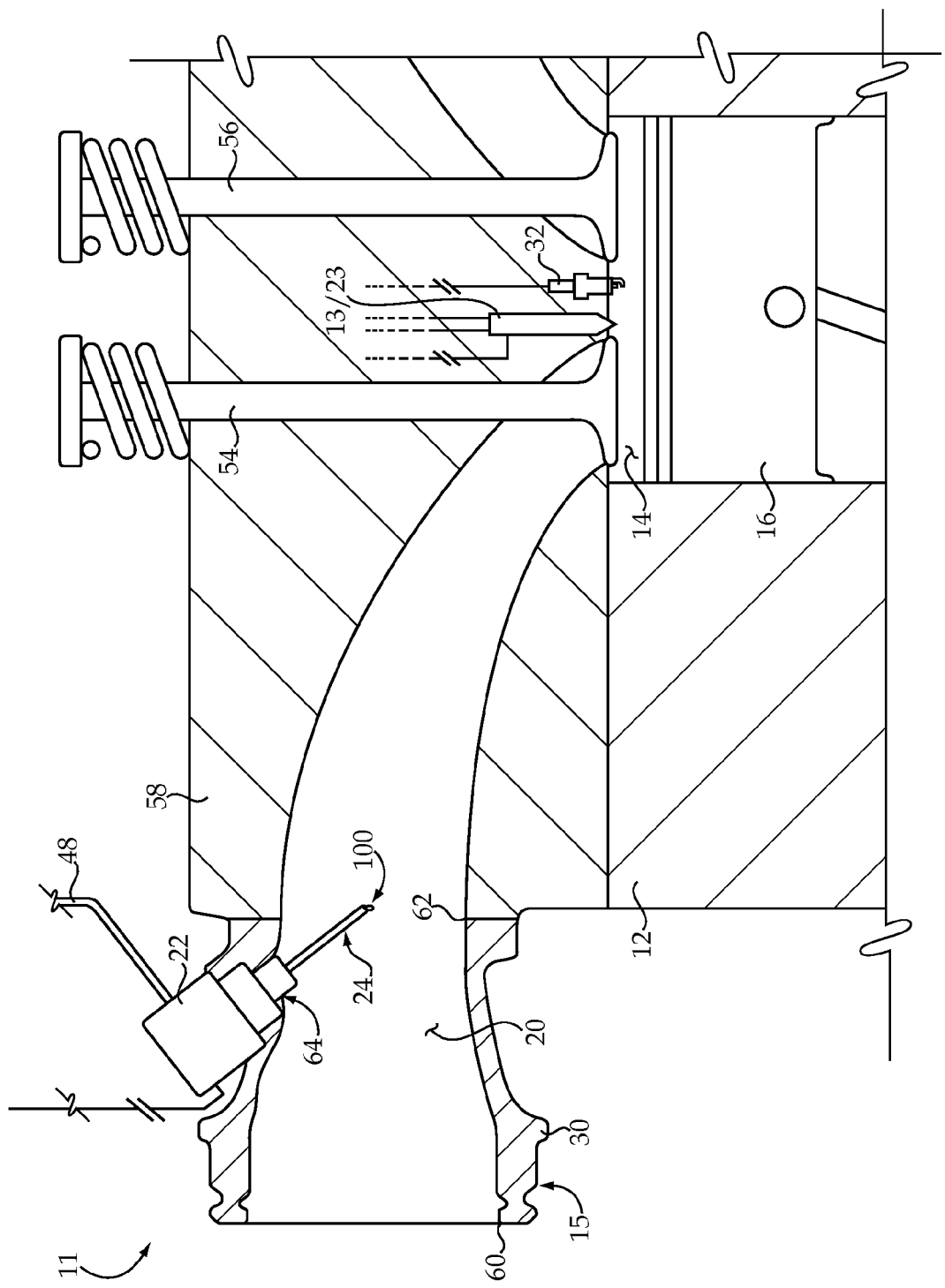
FIG. 2 is a partially sectioned side diagrammatic view of a portion of a gaseous fuel internal combustion engine at one stage of an engine cycle, according to one embodiment.
Figure 3:
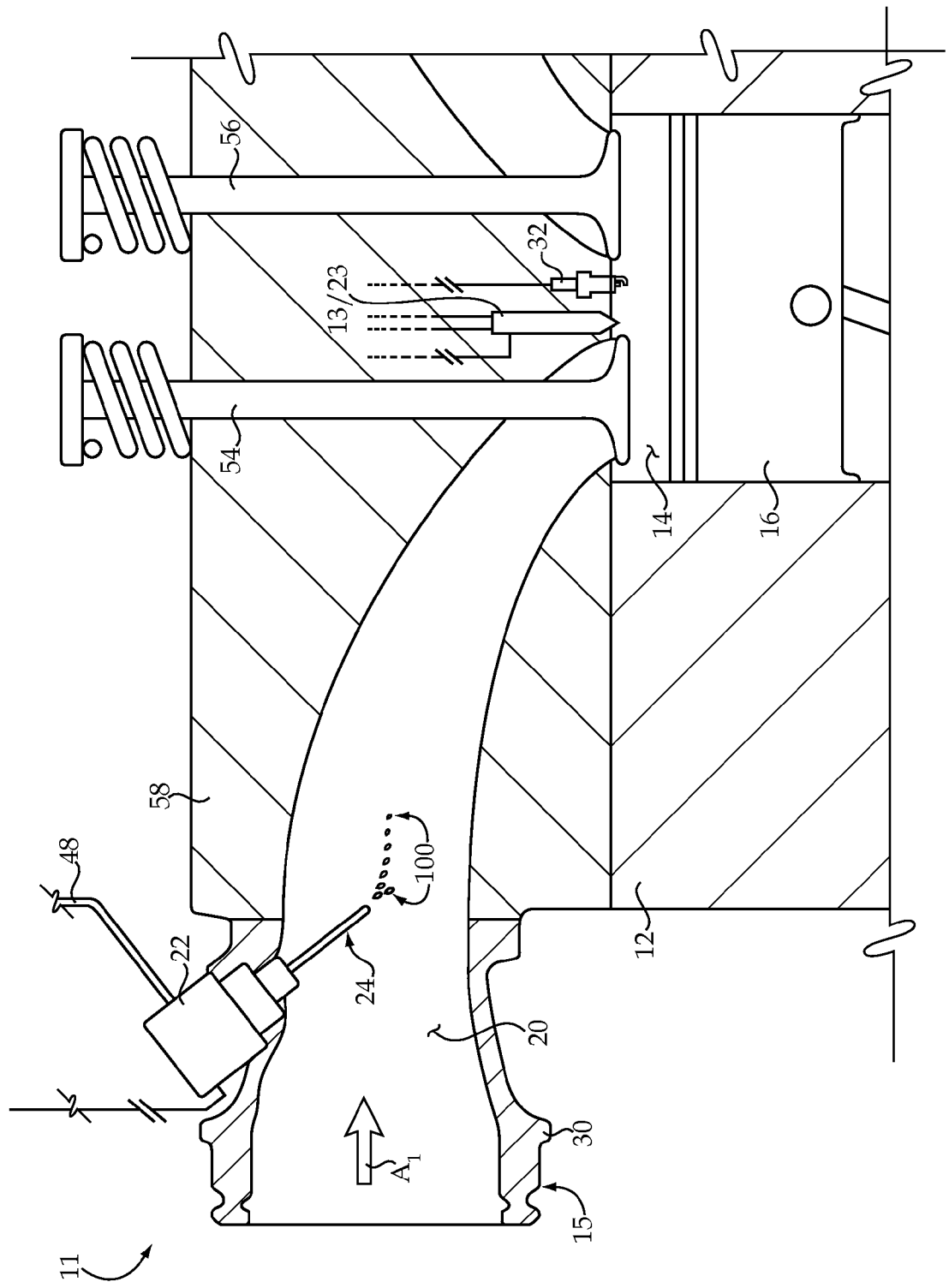
FIG. 3 is a partially sectioned side diagrammatic view of a portion of a gaseous fuel internal combustion engine at another stage of an engine cycle, according to one embodiment.
Figure 4:
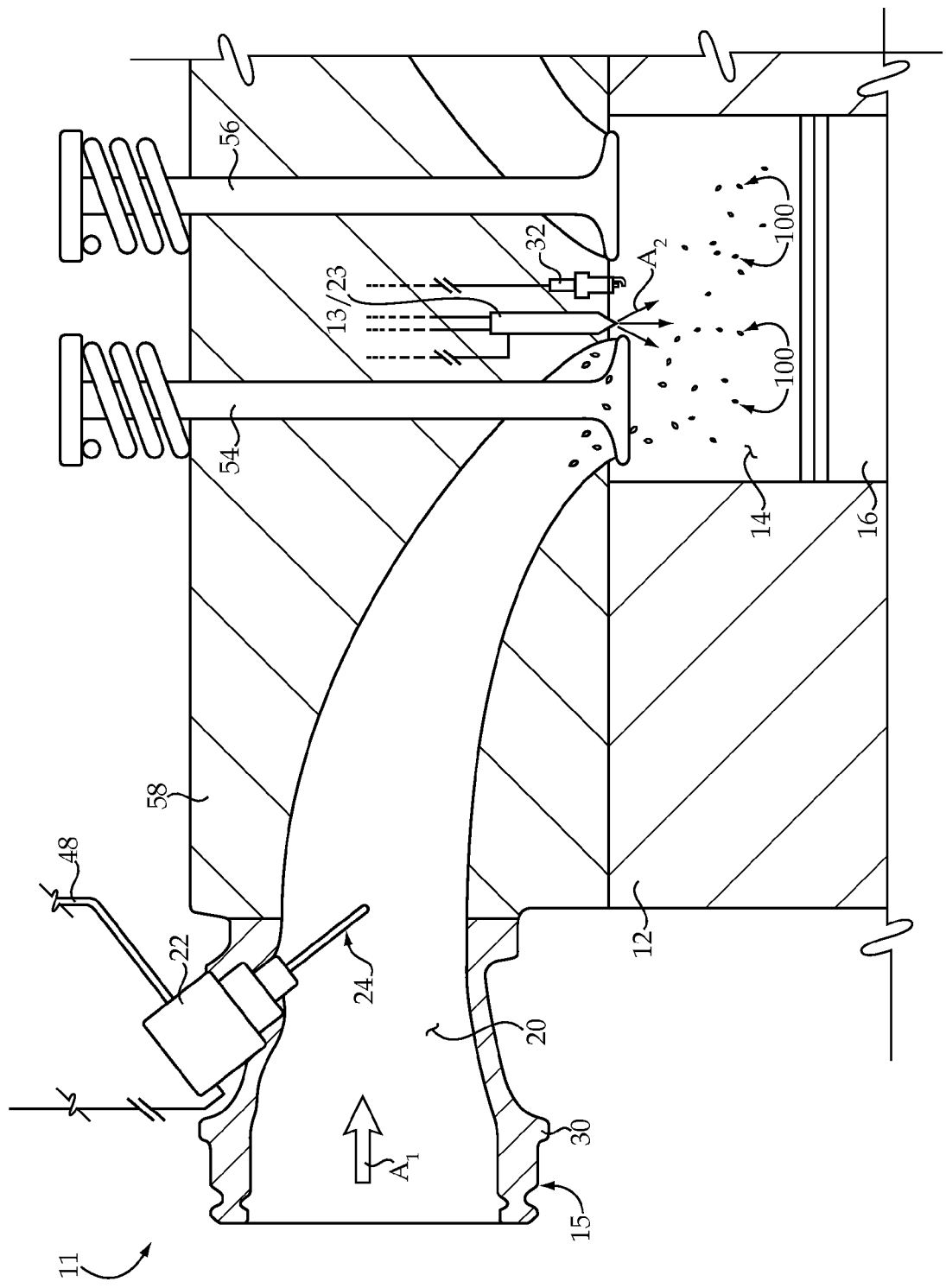
FIG. 4 is a partially sectioned side diagrammatic view of a gaseous fuel internal combustion engine at yet another stage of an engine cycle, according to one embodiment.

Each distributed ignition promoting mechanism 22 may be coupled with intake housing 18, and each includes a bead presentation device 24 extending into the corresponding intake passage 20. Each distributed ignition promoting mechanism 22 may be configured to present a liquid bead of distributed ignition promoting material for dislodging from the corresponding bead presentation device 24 by way of gases passing through the associated intake passage 20, as further described herein. Referring also to FIG. 2, there is shown a portion of engine 10 including combustion charge formation system 11. In FIG. 2, intake runner 30 is shown attached to an engine head 58 which is mounted on engine housing 12. It may be noted that intake runner 30 includes an upstream end 60 configured to connect with a charge air supply device such as air supply 34 by way of air conduit 36, and a downstream end 62. As mentioned above, air supply 34 may include a turbocharger or the like which supplies compressed air to intake runner 30 by way of intake manifold 26. It may further be noted that intake runner 30 defines a narrowing taper of intake passage 20 from upstream end 60 toward downstream end 62. Intake runner 30 may further define a port 64 positioned at a location between upstream end 60 and downstream end 62. Port 64 may receive bead presentation device 24 of distributed ignition promoting mechanism 22 therein.

As shown in FIG. 2, oil supply conduit 48 may connect with distributed ignition promoting mechanism 22 so that an oil such as engine lubricating oil may be supplied to distributed ignition promoting mechanism 22. A liquid bead of distributed ignition promoting material 100 is shown positioned on bead presentation device 24 in FIG. 2. It will be recalled that oil system 43 may be part of or connected with a main oil system for engine 10. Accordingly, oil conduit 48 may supply oil to distributed ignition promoting mechanism 22 from an oil pan or the like for engine 10. As alluded to above, however, in certain embodiments oil system 43 may be separate and independent of the main oil system for engine 10. Further, rather than engine lubricating oil, oil system 43 might supply other liquids to mechanism 22 known to be suitable for use in promoting distributed ignition.

Figure 5:
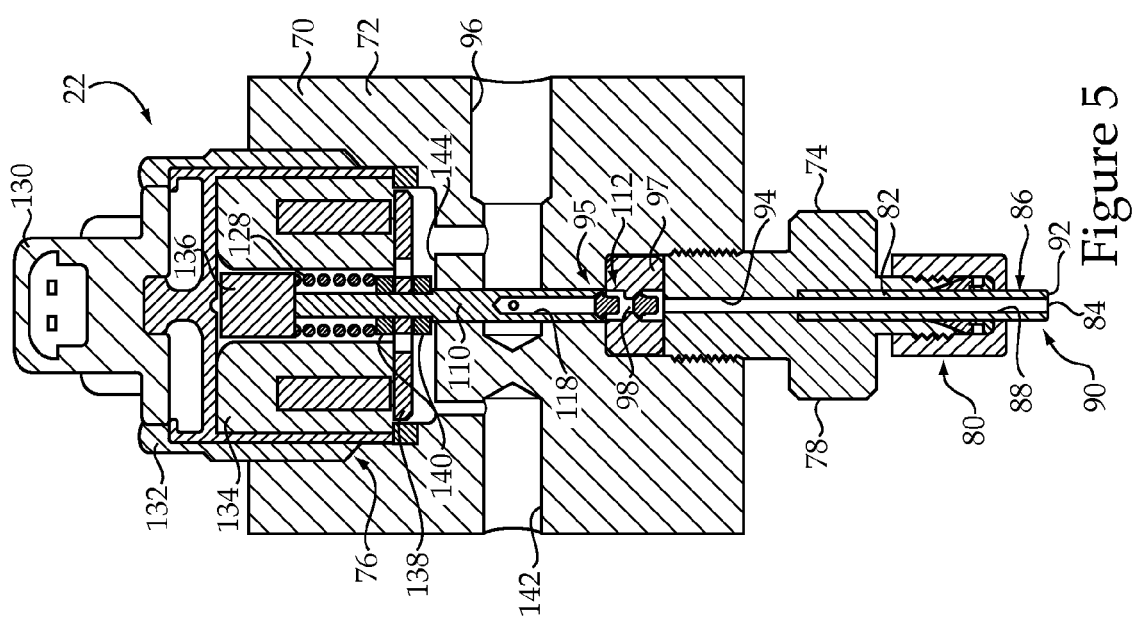
FIG. 5 is a sectioned side diagrammatic view of a distributed ignition promoting mechanism, according to one embodiment.

Turning now to FIG. 5, there is shown distributed ignition promoting mechanism 22 in more detail. Mechanism 22 may include a body 70 having a stem component 74 and a pump component 72. Stem component 74 may include a tube 82 having an inner surface 88, an outer surface 86, and a tip 90 which includes a bead holding surface 92. Bead holding surface 92 may be circumferential of a fluid outlet 84 located within the corresponding intake runner 30 when mechanism 22 is positioned for service in engine 10. In one embodiment, bead holding surface 92 may include a land area on tip 90 which extends radially between inner surface 88 and outer surface 86. Stem component 74 may further include an adapter 78 which defines an outlet passage 94 in fluid communication with an interior of tube 82, and a fitting assembly 80 which couples tube 82 to adapter 78, for example via threads. Adapter 78 may also be threadedly coupled with pump component 72 in one embodiment.

Pump component 72 may define a fluid inlet 96 and may include a pump 95. Pump 95 may include a plunger 110 coupled with an electrical actuator 76 and configured to pump oil between fluid inlet 96 and fluid outlet 84. Pump 95 may further include a valve assembly 112 having a plurality of different valve configurations, further described herein. In one embodiment, plunger 110 is movable from a refracted position to an advanced position to pump oil from fluid inlet 96 to fluid outlet 84. Plunger 110 may define an inlet passage 118 fluidly connecting with fluid inlet 96, and selectively fluidly connectable with outlet passage 94 via operation of valve assembly 112, as further described herein.

Figure 6:
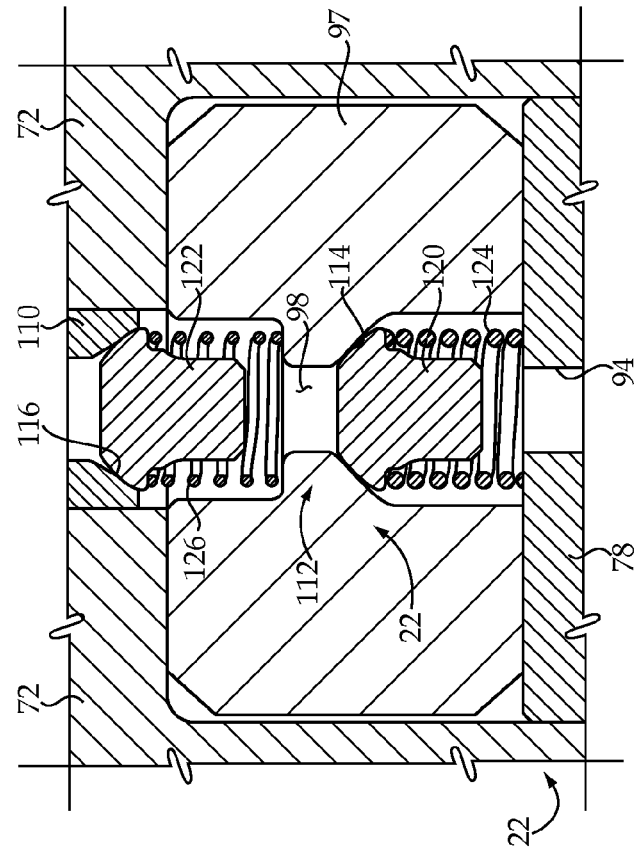
FIG. 6 is a sectioned side diagrammatic view of a portion of the mechanism shown in FIG. 5.

Referring also now to FIG. 6, pump component 72 may define a pumping chamber 98 which is positioned fluidly between fluid inlet 96 and fluid outlet 84. Pump component 72 may further include a seat component 97 which defines a first valve seat 114. Valve assembly 112 may include an outlet check 120 movable between a first outlet check position at which outlet check 120 contacts first valve seat 114 and a second outlet check position at which outlet check 120 does not contact first valve seat 114. It may be noted that first valve seat 114 is positioned fluidly between pumping chamber 98 and fluid outlet 84. Plunger 110 may define a second valve seat 116 positioned fluidly between pumping chamber 98 and fluid inlet 96. Valve assembly 112 may further include an inlet check 122 movable between a first inlet check position at which inlet check 122 contacts second valve seat 116 and a second inlet check position at which inlet check 122 does not contact second valve seat 116. A first biasing spring 124 may be coupled with outlet check 120 and biases outlet check 120 toward the first outlet check position. Valve assembly 112 may further include a second biasing spring 126 coupled with inlet check 122 and biasing inlet check 122 towards the first inlet check position. In one embodiment, first biasing spring 124 may have a relatively greater spring stiffness and second biasing spring 126 may have a relatively lesser spring stiffness, for reasons which will be apparent from the following description.

As mentioned above, valve assembly 112 may have a plurality of different valve configurations. Valve assembly 112 may include a first valve configuration at which pumping chamber 98 is blocked from both of fluid inlet 96 and fluid outlet 84. This is approximately the configuration shown in FIG. 6. Valve assembly 112 may further include a second valve configuration at which pumping chamber 98 is fluidly connected with fluid outlet 84 and blocked from fluid inlet 96, and a third valve configuration at which pumping chamber 98 is fluidly connected with fluid inlet 96 and blocked from fluid outlet 84. Those skilled in the art will appreciate that the second valve configuration, where pumping chamber 98 is fluidly connected with fluid outlet 84 and blocked from fluid inlet 96 would include a configuration where outlet check 120 is at the second outlet check position, and inlet check 122 is at the first inlet check position. The third valve configuration, at which pumping chamber 98 is fluidly connected with fluid inlet 96 and blocked from fluid outlet 84 would include a configuration where outlet check 120 is at the first outlet check position, and inlet check 122 is at the second inlet check position. As further described herein, moving plunger 110 from its retracted position, approximately as shown in FIG. 6, towards its advanced position, can adjust valve assembly 112 among the different valve configurations to pump oil between inlet 96 and outlet 84. Oil will be supplied to fluid inlet 96 at a first or supply pressure from oil conduit 48. Oil may be pumped at a second or delivery pressure from pumping chamber 98 to fluid outlet 84. The configuration and operation of pump 95 may be such that the delivery pressure is independent of the supply pressure. Thus, pumping oil between fluid inlet 96 and fluid outlet 84 may be understood to include decoupling the delivery pressure from the supply pressure. This strategy differs from that employed by other fluid delivery mechanisms commonly used in internal combustion engines, such as certain fuel injectors, and facilitates the delivery of relatively tightly controlled, relatively small volumes of oil to bead presentation device 24. In certain embodiments, the volume of a liquid bead presented via bead presentation device 24 each time pump 95 is actuated may be less than one cubic millimeter.

In the embodiment shown, electrical actuator 76 includes a solenoid actuator. Electrical actuator 76 may include a cap 130, a case 132 and a solenoid assembly 134 positioned at least partially within case 132. Solenoid assembly 134 may include an armature 138 coupled with plunger 110 via a set of armature nuts 140 threadedly positioned on plunger 110, for example. Electrical actuator 76 may include a normally energized electrical actuator. In other words, electrical current may be continuously supplied to solenoid assembly 134 causing armature 138 and, hence, plunger 110 to be held in a refracted position. At the retracted position of plunger 110/armature 138, an air gap 144 may exist between one of armature nuts 140 and body 70. A plunger biasing spring 128 may be provided which is positioned between a spacer or stop 136 and the other of armature nuts 140. When electrical current to solenoid assembly 134 is halted or reduced, plunger 110 may be moved in response to a biasing force of plunger biasing spring 128 toward its advanced position. Accordingly, de-energizing electrical actuator 76 may result in plunger 110 moving downward in the FIG. 5 illustration relative to body 70 a travel distance which is equal to air gap 144. An air bleed outlet 142 may be defined by body 70 to assist in operation of electrical actuator 76 in the described manner. The travel distance of plunger 110 may define the volume of liquid which is pumped by pump 95 to form a liquid bead at outlet 84.

In FIG. 6, plunger 110 is shown approximately as it would appear in its retracted position. Valve assembly 112 is in the first valve configuration where pumping chamber 98 is blocked from both fluid inlet 96 and fluid outlet 84. De-energizing electrical actuator 76 may cause plunger 110 to move toward its advanced position, under the influence of plunger biasing spring 128. As a result, plunger 110 can move inlet check 122 downwardly in the FIG. 6 illustration, against a bias of biasing spring 126. Downward movement of plunger 110 and inlet check 122 can cause a pressure of fluid such as engine lubricating oil in pumping chamber 98 to rise, causing outlet check 120 to move downward against the bias of biasing spring 124. As a result, valve assembly 112 is adjusted to its second valve configuration at which pumping chamber 98 fluidly connects with fluid outlet 84, and resulting in the pumping of fluid from pumping chamber 98 through outlet passage 94 and tube 82 to fluid outlet 84. In this general manner, de-energizing electrical actuator 76 will cause a bead of oil to be presented at fluid outlet 84. Since the fluid volume displaced may be relatively small, and the pumping pressure may be relatively low, the bead of liquid may be presented at fluid outlet 84 without spraying or otherwise dislodging the liquid bead from tip 90. It is believed that surface tension of the liquid bead assists in retention of the liquid bead on bead retention surface 92.

It will thus be understood by those skilled in the art that liquid is pumped from pumping chamber 98 against a bias of biasing spring 124. Following displacement of fluid from pumping chamber 98, outlet check 120 may be urged upward in FIG. 6 by way of the bias of biasing spring 124 back toward the first outlet check position. When electrical actuator 76 is once again energized, armature 138 and plunger 110 will tend to be drawn towards solenoid assembly 138, moving plunger 110 against the bias of plunger biasing spring 128 back towards its retracted position. Biasing spring 126 will urge inlet check 122 back upwards when plunger 110 moves towards its refracted position. The preceding displacement of fluid from pumping chamber 98, however, may allow fluid to flow back into pumping chamber 98 from fluid inlet 96 by way of inlet passage 118. In other words, when electrical actuator 76 is energized, plunger 110 may move upward and inlet check 122 may move relative to plunger 110 toward its second inlet check position in response to oil supplied to fluid inlet 96 at the supply pressure, replenishing the pumping chamber 98 in preparation for another pumping stroke. By fashioning springs 124 and 126 with different and appropriate spring stiffnesses, fluid will tend to flow into pumping chamber 98 from fluid inlet 96, overcoming the bias of spring 126, until pressure in pumping chamber 98 is approximately equal to the supply pressure, but fluid flow past seat 114 will be inhibited.

INDUSTRIAL APPLICABILITY

Referring to the drawings generally, it will be recalled that FIG. 2 depicts engine 10 and combustion charge formation system 11 at a state in which a liquid bead of distributed emission promoting material 100 is presented on bead presentation device within intake passage 20. Piston 16 is shown in cylinder 14 as it might appear shortly after having completed an exhaust stroke in a four stroke engine cycle, and just prior to commencing an intake stroke. Exhaust valve 56 and intake valve 54 are shown in closed positions. It will thus be understood that operating engine 10 may include forming the liquid bead of distributed ignition promoting material 100 on bead presentation device 24 prior to opening intake valve 54 in an engine cycle. After forming the liquid bead, the liquid bead may be held on bead presentation device 24 for a time prior to opening intake valve 54. In other words, distributed ignition promoting mechanism 22 may be actuated by operating pump 95 sufficiently prior to opening intake valve 54 that the liquid bead may reside on bead presentation device 24 for a period of time following formation thereof. If nothing were to occur to dislodge the liquid bead, it might remain on bead presentation device indefinitely.

In FIG. 3, intake valve 54 has been moved to an open position. Opening intake valve 54 during operating engine 10 may result in a rush of intake gases through intake passage 20, as shown via arrow $A_1$. It will be recalled that the liquid bead is held on presentation device 24 prior to opening intake valve 54. The rush of intake gases which results when intake valve 54 is opened will tend to dislodge the liquid bead from bead presentation device 24. In other words, the air and/or other gases passing through intake passage 20 may dislodge the liquid bead from the tip of bead presentation device 24 and commence carrying material 100 towards cylinder 14. In FIG. 3, distributed ignition promoting material 100 is shown as a plurality of droplets of material dislodged from bead presentation device 24. It is believed that the gases passing through intake passage 20 tend to disperse the liquid bead held on bead presentation device 24. This may occur either by dislodging the entire bead and thenceforth breaking it up into smaller droplets, or by breaking droplets from the liquid bead while still suspended on bead presentation device 24.

FIG. 4 illustrates internal combustion engine 10 and combustion charge formation system 11 as engine 10 might appear after piston 16 has completed most or all of an intake stroke and the gases passing through intake passage 20 have further dispersed distributed ignition promoting material 100 and carried material 100 into cylinder 14. Metering device 23 has been actuated to supply gaseous fuel into cylinder 14, as indicated by way of arrows $A_2$. Accordingly, at the state shown in FIG. 4, cylinder 14 includes a combustion charge comprised of a mixture of gaseous fuel, air and distributed ignition promoting material 100. From the state shown in FIG. 4, piston 16 may begin a compression stroke and intake valve 54 may be closed. Spark plug 32 may be activated at a desired time to distributively ignite the combustion charge by way of a spark in cylinder 14.

The concept of distributive ignition has been known for some time. Engineers have previously struggled, however, with how to successfully and reliably supply a relatively small quantity of distributed ignition promoting material into an intake passage of an internal combustion engine. Injection strategies may work for many applications. But in others, injecting a small enough quantity of oil, at just the right time, has proven challenging. The present disclosure addresses these and other concerns by enabling the delivery of a distributed ignition promoting material in a manner previously unknown. Rather than attempting to inject a distributed ignition promoting material into an intake passage, the present disclosure contemplates presenting distributed ignition promoting material for dislodging via and dispersal via an altogether different mechanism.

In the foregoing description, the intake gases passing through intake passage 20 which dislodge and disperse the distributed ignition promoting material 100 include only intake air. It should be appreciated, however, that in other embodiments, the intake gases might include a mixture of intake air and gaseous fuel, and possibly even recirculated exhaust or other gases. Similarly, while the foregoing description discusses the formation and presentation of a total of one liquid bead in a four stroke engine cycle, alternatives are contemplated. For instance, a first liquid bead could be presented on bead presentation device 24, dislodged and dispersed by intake gases, and then a second liquid bead could be formed on bead presentation device 24, all prior to and during one intake stroke. In still further embodiments, an even greater number of liquid beads might be presented.

Various factors may bear upon the selection of a suitable configuration for a bead presentation device according to the present disclosure. As described above, it may be desirable for bead holding surface 92 to include a planar land area extending radially between inner surface 88 and outer surface 86 of tip 82. In other embodiments, a bead holding surface having a non-planar configuration might be used, or a bead holding surface having surface texturing adapted to enhance or tailor the bead holding capability. Similarly, while FIGS. 2-4 illustrate bead presentation device 24 positioned at an angle relative to intake gases passing through intake passage 20, in other embodiments it might be desirable to orient bead holding device 24 differently. For example, bead presentation device 24 could be positioned such that tube 82 is oriented normal to the average flow direction of intake gases passing through intake passage 20. In still further embodiments, bead presentation device 24 might be oriented such that tip 82 extends in an upstream direction from port 64 towards the in-flowing intake gases.

In one practical implementation strategy, a relatively small size of tube 82 has been discovered to be appropriate. In such an embodiment, tube 82 may include an outer diameter of approximately 0.020 inches, and an inner diameter of approximately 0.012 inches. Factors which might affect the selection of an appropriate tube size or tube/tip geometry include overall cylinder displacement, charge air pressure and expected operating speed range and load range, as well as allowable $NO_X$ output. Viscosity or specific gravity of the selected distributed ignition material might also be factors in designing a tube having appropriate size and geometry. As alluded to above, it is contemplated that operation of engine 10 may take place similar to the manner described herein when engine 10 is operated at relatively high loads and burns a relatively lean fuel and air mixture. At lower loads or non-lean conditions, the use of distributed ignition promoting mechanism 22 may or may not be desirable, or might be implemented differently.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating a gaseous fuel internal combustion engine comprising the steps of:

forming a liquid bead of distributed ignition promoting material on a bead presentation device in an intake passage of the gaseous fuel internal combustion engine;

dislodging the liquid bead from the bead presentation device by way of gases passing through the intake passage and impinging upon the liquid bead so as to overcome a tendency of the liquid bead to remain on the bead presentation device;

metering a gaseous fuel from a fuel supply conduit into a cylinder of the gaseous fuel internal combustion engine; and distributively igniting a charge that includes the gaseous fuel, air and the distributed ignition promoting material, in the cylinder.

2. The method of claim 1 further comprising a step of forming the charge at least in part by dispersing the liquid bead by way of the gases passing through the intake passage.

3. The method of claim 2 wherein the step of forming a liquid bead further includes forming the liquid bead at a location in the intake passage which is downstream of an intake manifold plenum and upstream of the cylinder.

4. The method of claim 3 wherein the step of distributively igniting further includes igniting the charge by way of a spark.

5. The method of claim 1 wherein the step of forming the liquid bead further includes forming the liquid bead prior to opening an intake valve for the cylinder during an engine cycle, the method further comprising a step of holding the liquid bead on the bead presentation device for a time prior to opening the intake valve.

6. The method of claim 5 wherein the step of forming the liquid bead further includes forming a liquid bead of oil on the bead presentation device.

7. The method of claim 6 wherein the step of forming the liquid bead further includes the steps of supplying engine lubricating oil at a first pressure to a fluid inlet of a pump, and pumping the engine lubricating oil via the pump to a fluid outlet of the bead presentation device at a second pressure, and wherein the step of pumping the engine lubricating oil includes decoupling the second pressure from the first pressure.

8. The method of claim 7 wherein the step of pumping further includes moving a plunger of the pump in response to de-energizing an electrical actuator.

9. The method of claim 1 further comprising a step of moving a piston four strokes per engine cycle of the internal combustion engine, and wherein the step of forming a liquid bead includes forming a total of one liquid bead for every four strokes of the piston.

10. A gaseous fuel internal combustion engine comprising:
an engine housing defining at least one cylinder;
an intake housing defining an intake passage fluidly connecting with the at least one cylinder;
a gaseous fuel delivery mechanism coupled with the engine housing and configured to meter a gaseous fuel from a fuel supply conduit into the at least one cylinder; and
a distributed ignition promoting mechanism including a bead presentation device extending into the intake passage and configured to present a liquid bead of distributed ignition promoting material for dislodging from the bead presentation device by way of gases passing through the intake passage;
the distributed ignition promoting mechanism further including a pump component for supplying distributed ignition promoting material to the bead presentation device, the pump component defining a fluid inlet and a pumping chamber, and having a valve assembly with an inlet check fluidly positioned between the fluid inlet and the pumping chamber, and an outlet check fluidly positioned between the pumping chamber and the bead presentation device.

11. The internal combustion engine of claim 10 wherein:
the engine housing defines a plurality of cylinders;
the intake housing includes an intake manifold having a plenum and a plurality of intake runners which each define an intake passage fluidly connecting with one of the plurality of cylinders; and
the internal combustion engine further includes a plurality of spark plugs each positioned within one of the plurality of cylinders, and a plurality of distributed ignition promoting mechanisms each having a bead presentation device coupled with one of the intake runners and extending into the corresponding intake passage at a location which is downstream of the plenum and upstream of the corresponding one of the plurality of cylinders.

12. The internal combustion engine of claim 11 further comprising an oil system having an oil sump, an oil transfer pump and an oil supply conduit, each of the plurality of distributed ignition promoting mechanisms including a body having a stem component which includes the corresponding bead presentation device and defines a fluid outlet within the corresponding intake runner, and a pump component coupled with the stem component which defines a fluid inlet connecting with the oil supply conduit.

13. The internal combustion engine of claim 12 wherein each of the stem components includes a tube having an inner surface, an outer surface, and a tip having a bead holding surface which is circumferential of the fluid outlet and extends radially between the inner surface and the outer surface.

14. The internal combustion engine of claim 12 wherein:
each of the pump components defines a pumping chamber and includes a plunger, an electrical actuator coupled with the plunger and a valve assembly; and
each valve assembly includes a first valve configuration at which the pumping chamber is blocked from both the fluid inlet and the fluid outlet, a second valve configuration at which the pumping chamber is fluidly connected with the fluid outlet and blocked from the fluid inlet, and a third valve configuration at which the pumping chamber is fluidly connected with the fluid inlet and blocked from the fluid outlet.

15. The internal combustion engine of claim 14 wherein:
the pump component further includes a seat component defining a first valve seat positioned fluidly between the pumping chamber and the fluid outlet;
the plunger defines a second valve seat positioned fluidly between the pumping chamber and the fluid inlet;
the valve assembly further includes an outlet check movable between a first outlet check position at which the outlet check contacts the first valve seat and a second outlet check position at which the outlet check does not contact the first valve seat; and
the valve assembly further includes an inlet check movable between a first inlet check position at which the inlet check contacts the second valve seat and a second inlet check position at which the inlet check does not contact the second valve seat.

16. The internal combustion engine of claim 15 further comprising a first biasing spring coupled with the outlet check and biasing the outlet check toward the first outlet check position, and a second biasing spring coupled with the inlet check and biasing the inlet check toward the first inlet check position, the first biasing spring having a relatively greater spring stiffness and the second biasing spring having a relatively lesser spring stiffness.

17. The internal combustion engine of claim 15 wherein the plunger is movable between a retracted position and an advanced position, the pump further comprising a plunger biasing spring biasing the plunger toward the retracted position, wherein the plunger is movable by way of the plunger biasing spring toward the advanced position in response to de-energizing the electrical actuator.

18. A combustion charge formation system for a gaseous fuel internal combustion engine comprising:
- a gaseous fuel delivery mechanism including a fuel supply conduit and a metering device configured to meter gaseous fuel from the fuel supply conduit to a cylinder of a gaseous fuel internal combustion engine;
- a combustion air delivery mechanism including an intake housing defining an intake passage; and
- a distributed ignition promoting mechanism including a bead presentation device extending into the intake passage and configured to present a liquid bead of distributed ignition promoting material for dislodging from the bead presentation device by way of gases passing through the intake passage;
- the distributed ignition promoting mechanism further including a pump component defining a fluid inlet and a pumping chamber, and having a plunger movable from a retracted position to an advanced position to displace distributed ignition promoting material from the pumping chamber to the bead presentation device for forming the liquid bead, and an inlet check contacting the plunger and movable between a first position blocking fluid communication between the pumping chamber and the fluid inlet, and a second, open position for replenishing the pumping chamber.

19. The combustion charge formation system of claim 18 wherein:
- the distributed ignition promoting mechanism further includes a body having the pump component therein, a stem component defining the fluid outlet within the intake passage, and an oil supply conduit fluidly connecting with the fluid inlet;
- the pump component further including a valve assembly that includes the inlet check and having a first valve configuration at which the pumping chamber is blocked from both the oil supply conduit and the intake passage, a second valve configuration at which the pumping chamber is fluidly connected with the intake passage and blocked from the oil supply conduit, and a third valve configuration at which the pumping chamber is fluidly connected with the oil supply conduit and blocked from the intake passage.

20. The combustion charge formation system of claim 19 wherein the intake housing includes an upstream end configured to connect with a charge air supply device, a downstream end, and defines a narrowing taper of the intake passage from the upstream end toward the downstream end, and wherein the intake housing further defines a port receiving the bead presentation device at a location which is between the upstream end and the downstream end.

* * * * *